Sept. 2, 1958 S. W. BRIGGS 2,850,169
STACKED DISC FILTER CARTRIDGE
Filed Feb. 8, 1955 2 Sheets-Sheet 1
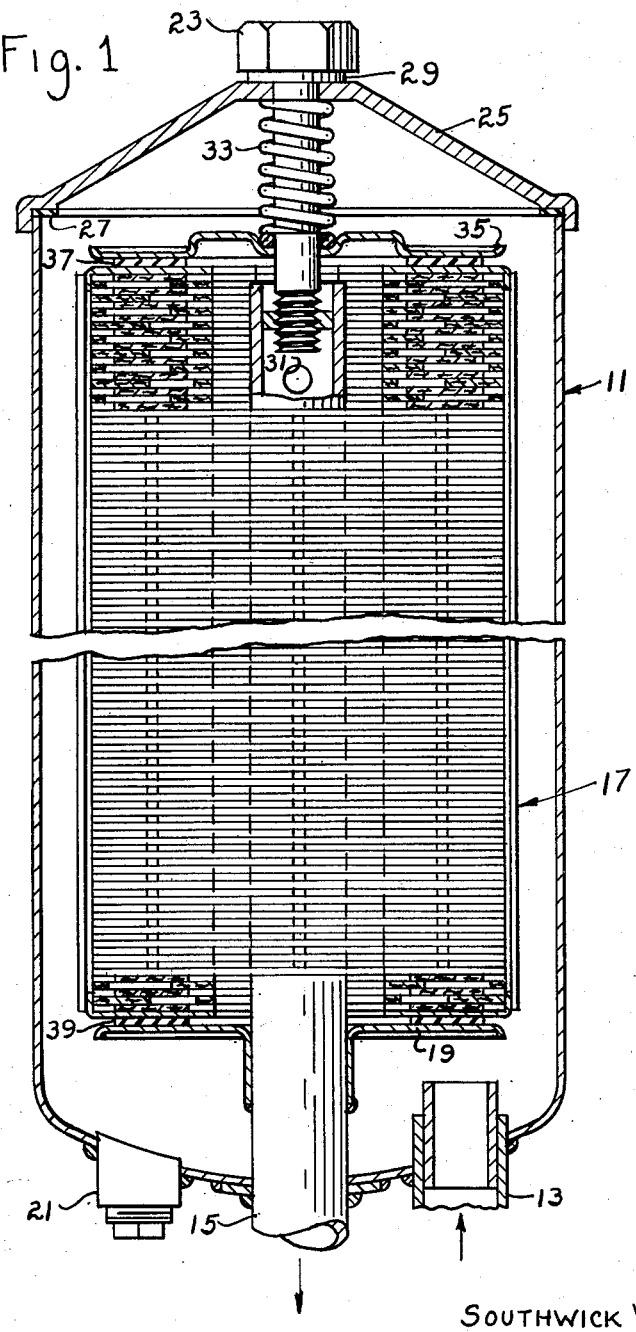
SOUTHWICK W. BRIGGS
INVENTOR.
BY Albert L. Jeffers
ATTORNEY Sept. 2, 1958 S. W. BRIGGS 2,850,169
STACKED DISC FILTER CARTRIDGE
Filed Feb. 8, 1955 2 Sheets-Sheet 2
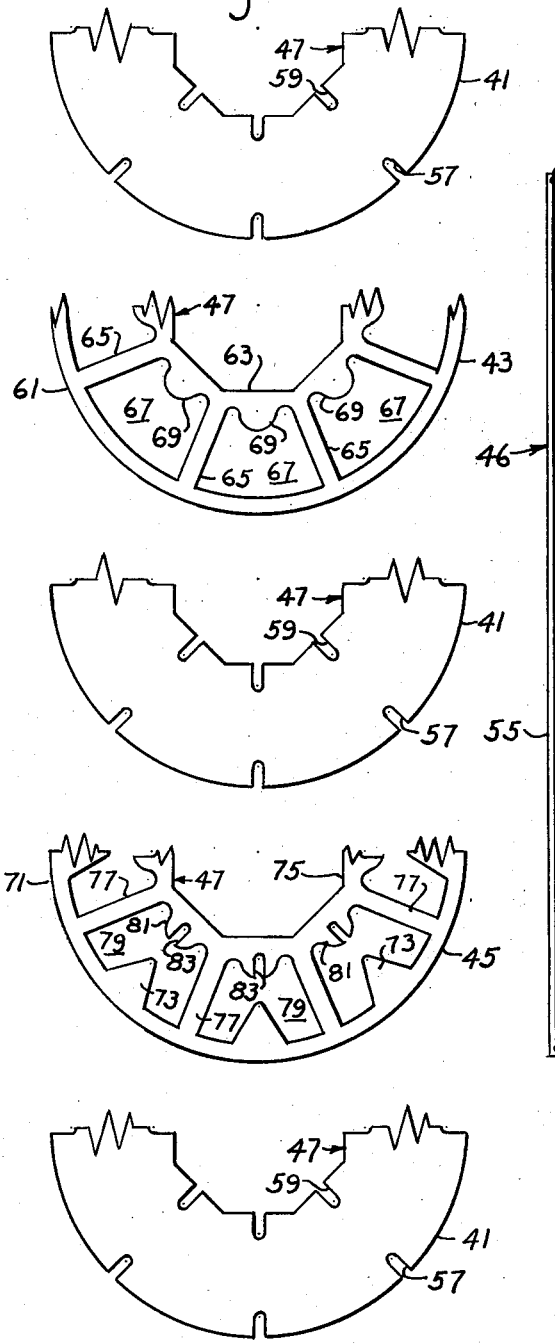
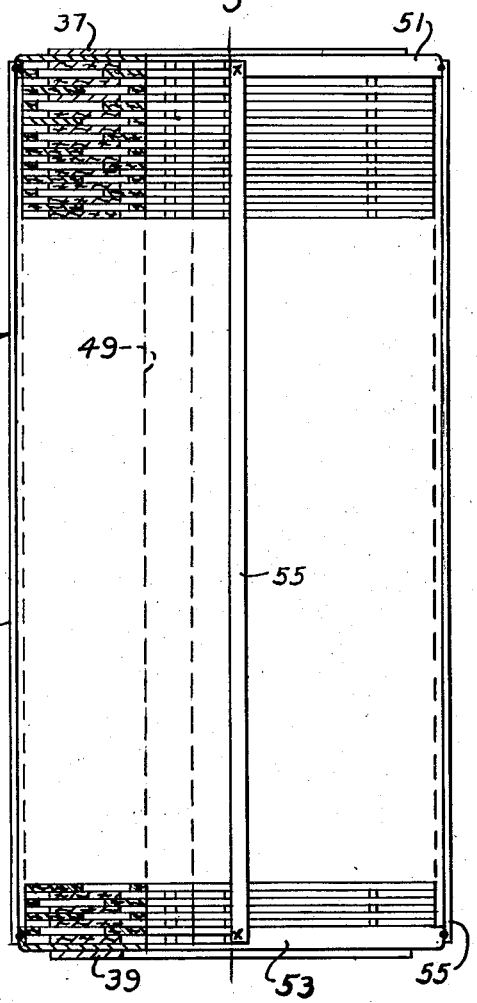
SOUTHWICK W. BRIGGS
INVENTOR.
BY Albert L. Jeffers
ATTORNEY

United States Patent Office 2,850,169
Patented Sept. 2, 1958

2,850,169

STACKED DISC FILTER CARTRIDGE

Southwick W. Briggs, Laurel, Md.

Application February 8, 1955, Serial No. 486,850

2 Claims. (Cl. 210—492)

This invention relates to an oil filter and more particularly to a filter cartridge formed by a series of stacked discs. More specifically, the invention is an improvement upon the disc elements of the cartridge shown in the patent to S. W. Briggs et al., Patent Number 2,575,995, issued November 20, 1951.

In general, the rate at which a fluid may pass through a filter is dependent upon the surface area of the filtering medium that is exposed to the liquid being filtered. Filter cartridges formed from a series of discs stacked to form a unitary structure were designed to provide larger filtering area for the liquid. The stacked disc cartridges in the prior art are designed with ribs or webs having free ends at either the inlet disc or at the outlet disc, which after a period of use are weakened due to the lack of rigidity in the rib or web sections, thus the life of the cartridge is shortened.

Another disadvantage of the stacked disc cartridges in the prior art is the lack of positive positioning in assembling the discs with automatic stacking equipment due to the fact that either the inner or outer annulus is omitted on one or the other of the elements.

To eliminate the above disadvantages, it is an object of my invention to provide a filter cartridge of the disc type in which each disc has an inner and outer annulus to afford sufficient rigidity in the rib section and to provide positive stacking of each element to avoid by-passing of the liquid.

Another object of my invention is the provision of a filter cartridge of the disc type capable of handling a high rate of flow of liquid being filtered.

A further object of this invention is to provide a filter cartridge of low cost capable of being readily replaced in the filter unit.

A salient object of my invention is the provision of disc elements which can be assembled by automatic stacking equipment without crimping the elements.

A still further object of my invention is the provision of a clarifier element which will effectively remove impurities in the range of 10 to 12 microns from the fluid being filtered.

Another object of this invention is to provide a filter cartridge having the capacity to separate large quantities of foreign matter from the liquid before it is necessary to replace the cartridge.

With the foregoing objects in view, together with such other objects and advantages as may subsequently appear, the invention resides in the elements and in the combination, construction and arrangements of the elements hereinafter described and claimed, and illustrated by way of example in the accompanying drawings, in which:

Figure 1 is a vertical view, partly in section and in elevation, of a filter, illustrating the arrangement of the cartridge therein.

Figure 2 is an elevation, partially in section, of a filter cartridge constructed according to this invention.

Figure 3 is a plan view, with parts broken away, of the discs which are employed in the filter cartridge illustrated in Figures 1 and 2.

Referring particularly to Figure 1, a clarifier is illustrated having a casing 11 provided with an inlet tube 13 and a discharge tube 15. In the event that it is desired to effect filtration by having the oil pass from the inside of the cartridge to the outside, the functions of tubes 13 and 15 are, of course, reversed. The cartridge is indicated generally by the numeral 17 and is supported upon a flange or base plate 19 mounted upon the discharge tube 15. Casing 11 is also equipped with a drain plug 21 for the removal of any sediment which may collect in the sump at the bottom of the casing.

In the clarifier structure illustrated in Figure 1, the discharge tube 15 extends up through the center of casing 11 for engagement with a bolt 23 passing through the top or lid 25. Discharge tube 15 is internally threaded at its upper end for engagement with the bolt which, on tightening, holds top 25 firmly against the upper edge of the lower portion of the casing 11. A gasket 27 prevents leakage between the lid and the upper portion of the casing. Similarly, a gasket 29 prevents leakage through the top 25 at the point where bolt 23 passes therethrough.

Discharge tube 15 is apertured at 31 above the base plate 19 to allow the filtrate to flow from the cartridge 17. In order to hold the cartridge 17 securely in place, a compressed helical spring 33 is provided around bolt 23 and presses against a movable plate 35. The plate 35 in turn bears against the filter cartridge 17 to hold it firmly in place between the plate 35 and flange 19. Gaskets 37 and 39 prevent by-passing of unclarified liquid around the clarifier cartridge 17 at the upper and lower ends of the cartridge, respectively.

As illustrated in Figures 2 and 3, the clarifier cartridge 17 is constructed of a stack of superimposed elements or discs 41, 43 and 45 arranged to form a unitary, tubular filtering element. The discs 41, 43 and 45 have a central aperture 47, preferably in the shape of a regular octagon to facilitate alignment of the discs which, on stacking form a central bore 49 through the cartridge 17. The filtering element 46 is bounded at its ends by rigid plates or end caps 51 and 53. End plates 51 and 53 are connected by any suitable means such as metal straps 55 which hold the plates together and maintain the discs in a compressed condition. The combination of the rigid plates 51, 53, straps 55 and the compressed condition of the discs forming the filter element gives a rugged structure without gluing, cementing or otherwise securing the edges of the discs.

In general, the structure of the cartridge is formed by a filter disc 41 in alternating relationship with either the spacer disc 43 or drainage disc 45. However, a wide variation in the order of the discs is possible without departing from the spirit of this invention.

Filter discs 41 comprises an annulus of filtering material preferably of the cellulosic type. The outer periphery of the annulus is provided with a short inlet channel or passage 57 and the inner edge or hub which forms the central bore is provided with a short outlet or drainage channel 59.

Spacer disc 43 may be composed of the same material as the filter disc 41. The outer periphery member 61 of the spacer disc is in the form of an annulus and the inner periphery member 63 is in the form of an octagon to aid in the proper selectivity of the filter media of the filter discs as they are stacked. Extending radially from the member 63 are a plurality of webs 65 which extend to the outer periphery member 61 of the spacer disc 43 and defines a chamber or pocket 67.

The member 63 is provided with tabs 69 which protrude into the chamber or pocket 67 and serve to close off the discharge channel 59.

Drainage disc 45 is composed of an outer annulus member 71 provided with triangular tabs 73 which protrude inwardly and serve to close off the inlet channel 57. The inner periphery member 75 is in the form of an octagon and is provided with radially extending web members 77 which extend to the member 71 of the drainage disc 45 and defines a chamber or pocket 79. The member 75 is provided with tabs 81 which protrude into the chamber or pocket 79. Each tab 81 is provided with a slot or channel 83 which is constructed to receive the liquid after passage through the filter disc 41 and directs the filtrate through channel 59 to the central bore 49 of the cartridge.

*Operation*

For an outside-in filtration the liquid to be filtered enters the casing 11 through inlet pipe 13 and completely fills the inside of the casing. The liquid enters the blind pocket 57 of the cartridge 17 through channels 57, and then passes through the filter disc 41, axially of the cartridge, and into the discharge chamber 79 of the drainage disc 45 on the opposite side of the filter disc 41. From the discharge chamber the liquid will flow back to the system through channels 83, channels 59, central bore 49 and discharge tube 15. The liquid may also pass directly through the members 63 and 75 of the spacer and drainage discs, respectively, in which event the liquid is filtered, and then drain directly into the bore 49.

The cartridge herein disclosed has a large filtering area and thereby effects a high full flow rate with a 10 to 12 micron selectivity of foreign matter. Crimping of the elements are eliminated; thus preventing any distortion of the elements which would allow larger particles of contaminate to pass into the filtrate.

It is obvious that various changes may be made in the form, structure and arrangement of parts without departing from the spirit of the invention. Accordingly applicant does not desire to be limited to the specific embodiment disclosed herein primarily for purposes of illustration; but instead, he desires protection falling fairly within the scope of the appended claims.

I claim:

1. A filter cartridge comprising spacer discs, drainage discs and filter discs stacked to form a tubular filter element, said spacer disc having a continuous inner member with webs extending radially to a continuous outer annulus to form a closed pocket, said inner member having a tab protruding into the closed pocket, said drainage discs having a continuous inner portion with webs extending radially to an outer annulus to form a drainage chamber, said drainage discs having a first tab with a drainage channel and a second tab extending inwardly from the outer annulus, said filter discs having an outer periphery with a number of spaced inlet channels opening thereon and an inner periphery with a number of spaced outlet channels, said spacer discs and drainage discs positioned with the filter discs disposed therebetween whereby the inlet channel will communicate directly with the closed pocket and the drainage chamber will communicate with the outlet channel through the drainage channel.

2. A filter cartridge comprising spacer discs, drainage discs and filter discs stacked to form a filter cartridge with a central bore, said filter discs having an outer periphery with a number of inlet passages opening thereon and an inner periphery with a number of outlet channels communicating with the central bore, said spacer discs having means defining closed pockets, said means including tabs for closing the outlet channels from communicating with the closed pockets, said drainage discs having webs extending from an inner member to the outer annulus for defining drainage chambers, said inner members having tabs with channels adapted to communicate with the outlet channels, said annulus having tabs adapted for closing said inlet passages from communicating with the drainage chambers, said spacer discs being positioned adjacent one side of the filter discs in the stacked filter cartridge whereby the inlet passages communicate directly with the closed pockets and the drainage discs being positioned adjacent the other side of the filter discs whereby the drainage chambers communicate indirectly with the central bore.

References Cited in the file of this patent

UNITED STATES PATENTS 2,359,475    Gauthier                 Oct. 3, 1944

FOREIGN PATENTS 645,724    Great Britain            Nov. 8, 1950